United States Patent
Zhu

(10) Patent No.: US 8,634,387 B2
(45) Date of Patent: Jan. 21, 2014

(54) ACK/NACK BUNDLING

(75) Inventor: Chenxi Zhu, Palo Alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 148 days.

(21) Appl. No.: 13/070,225

(22) Filed: Mar. 23, 2011

(65) Prior Publication Data

US 2012/0087349 A1    Apr. 12, 2012

Related U.S. Application Data

(60) Provisional application No. 61/392,030, filed on Oct. 11, 2010.

(51) Int. Cl.
*H04Q 11/00* (2006.01)
(52) U.S. Cl.
USPC ........... 370/336; 370/433; 370/437; 370/441; 370/442; 714/749
(58) Field of Classification Search
None
See application file for complete search history.

(56) References Cited

U.S. PATENT DOCUMENTS

| | | | |
|---|---|---|---|
| 2001/0027536 A1* | 10/2001 | Soderkvist et al. | 714/18 |
| 2009/0213769 A1* | 8/2009 | Shen et al. | 370/280 |
| 2010/0272048 A1* | 10/2010 | Pan et al. | 370/329 |
| 2010/0329197 A1 | 12/2010 | Boariu et al. | |
| 2011/0246840 A1* | 10/2011 | Khoshnevis et al. | 714/712 |
| 2013/0194983 A1 | 8/2013 | Ahn et al. | |

FOREIGN PATENT DOCUMENTS

| | | |
|---|---|---|
| CN | 101689984 | 3/2010 |
| CN | 101816212 | 8/2010 |

OTHER PUBLICATIONS

Chinese Office Action and English translation; Application No. 201110307431.9; pp. 38, Nov. 5, 2013.

* cited by examiner

*Primary Examiner* — Jeffrey M Ruthkowski
*Assistant Examiner* — Hardikkumar Patel
(74) *Attorney, Agent, or Firm* — Baker Botts L.L.P.

(57) ABSTRACT

In one embodiment, a first system receives N data transmissions from a second system. The first system combines N ACK/NACK responses, corresponding to the N data transmissions received, and encodes the combined N ACK/NACK responses by selecting a position of a communication channel over which the first system sends ACK/NACK transmissions to the second system and setting a value for each bit sent during each ACK/NACK transmission based on the combined N ACK/NACK responses. The first system sends the bits at the selected position of the communication channel. The second system, upon receiving the bits sent at the selected position of the communication channel, decodes the N ACK/NACK responses based on the position at which the bits are sent and the bits.

18 Claims, 4 Drawing Sheets

ACK/NACK BUNDLING

RELATED APPLICATION

This application claims benefit under 35 U.S.C. §119(e) of U.S. Provisional Patent Application No. 61/392,030, entitled LTE-TDD Ack/Nack Bundling and filed 11 Oct. 2010, which is hereby incorporated by reference.

TECHNICAL FIELD

This disclosure generally relates to wireless communications.

BACKGROUND

In wireless communications, a user device may connect with a base station wirelessly. The user device may send data to and receive data from the base station over the wireless connection between them. When one party (e.g., either the user device or the base station) sends a data transmission to the other party (e.g., either the base station or the user device), the receiving party may send a response back to the sending party, indicating whether the data transmission has been successful. For example, if the data transmission is successful, the receiving party may send an ACK response back to the sending party. However, if the data transmission is not successful, the receiving party may send a NACK response back to the sending party, in which case the sending party may resend the data transmission to the receiving party.

DESCRIPTION OF EXAMPLE EMBODIMENTS

A user device may wirelessly connect with a base station, and send data to or receive data from the base station. The wireless connection between the user device and the base station may have multiple channels, which may include, for example and without limitation, the Physical Downlink Shared Channel (PDSCH), the Physical Uplink Shared Channel (PUSCH), or the Physical Uplink Control Channel (PUCCH). Typically, the data transmitted between the user device and the base station are sent over the PDSCH, while the corresponding ACK/NACK responses are sent over the PUSCH or the PUCCH.

Figure 1:
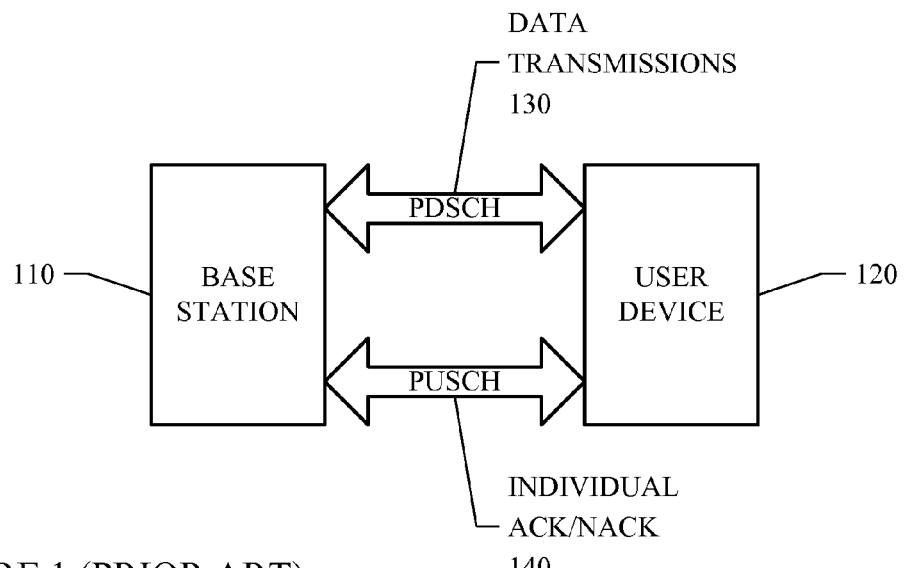
FIG. 1 (prior art) illustrates an example user device wirelessly connected with an example base station.

FIG. 1 illustrates an example user device 120 wirelessly connected with an example base station 110. Typically, each time data are transmitted either from base station 110 to user device 120 or from user device 120 to base station 110, the receiving party transmits an acknowledgement back to the sending party in response. More specifically, if the data transmission is successful and the receiving party is able to decode the received data as expected, the receiving party sends an ACK back to the sending party. On the other hand, if the data transmission is unsuccessful and the receiving party is not able to decode the received data as expected (e.g., there are errors in the received data or the received data are corrupted), the receiving party sends a NACK back to the sending party. In this case, the sending party may resend the data. Of course, both base station 110 and user device 120 may be either the sending party or the receiving party.

Again, the wireless connection between base station 110 and user device 120 may have multiple channels, including the PDSCH, the PUSCH, or the PUCCH. In general, data transmissions 130 between base station 110 and user device 120 are sent over the PDSCH, while ACK/NACK responses 140 between base station 110 and user device 120 are sent over the PUSCH or the PUCCH.

Currently, each time the base station sends data to the user device over the PDSCH, the user device sends a corresponding ACK/NACK response back to the base station over the PUSCH or the PUCCH, indicating whether the data have been received successfully. Thus, if the base station sends N data transmissions to the user device over the PDSCH, the user device sends N ACK/NACK responses back to the base station over the PUSCH or the PUCCH. An ACK response indicates that the data have been received successfully, while a NACK response indicates that the data have not been received successfully. These ACK/NACK responses may be more specifically referred to as Automatic Repeat Request (ARQ) or Hybrid Automatic Repeat Request (HARQ) ACK/NACK responses, depending on whether the receiving party of the ACK/NACK responses uses the previously received information for decoding. If the base station receives an ACK response to a data transmission, the base station understands that the data transmission is successful and no more action is needed with respect to the data transmission. On the other hand, if the base station receives a NACK response to a data transmission, the base station understands that the data transmission has failed and may resend the data to the user device.

Figure 2:
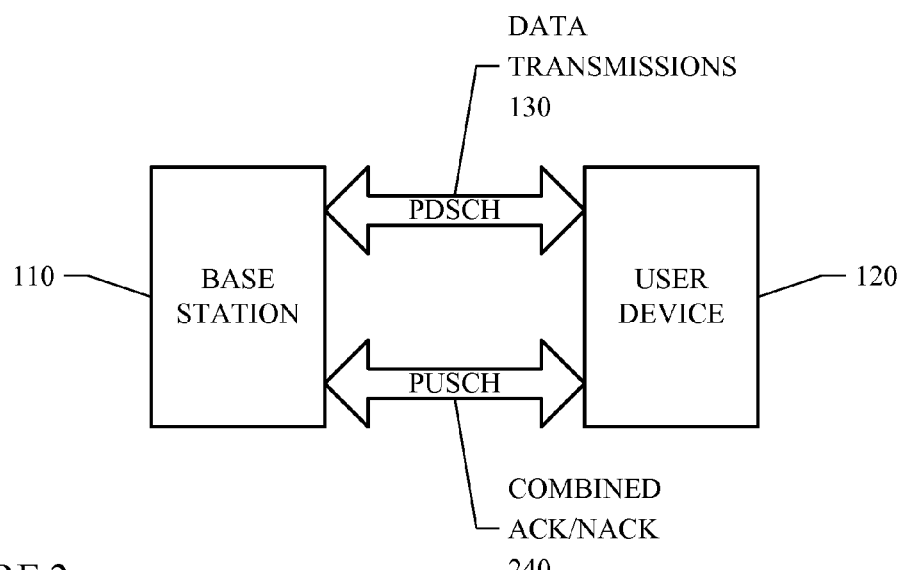
FIG. 2 illustrates an example user device wirelessly connected with an example base station.

Some types of user devices may be mobile devices (e.g., mobile telephones, tablet computers, personal digital assistants, etc.). These mobile devices often have limited power supplies (e.g., batteries). Sending ACK/NACK responses to a base station consumes power and other resources. To save power and other resources of a user device, in particular embodiments, the user device may bundle or combine multiple ACK/NACK responses, corresponding to multiple data transmissions received from a base station over the PDSCH, into a single ACK/NACK transmission sent back to the base station over the PUSCH or the PUCCH. That is, the single ACK/NACK transmission sent from the user device to the base station includes multiple ACK/NACK responses corresponding to multiple data transmissions received from the base station. The ACK/NACK responses bundled together may be ARQ or HARQ or other types of ACK/NACK responses. FIG. 2 illustrates, again, user device 120 wirelessly connected with base station 110. Data transmissions 130 are sent over the PDSCH, and ACK/NACK responses 240 are sent over the PUSCH or the PUCCH. However, unlike in FIG. 1, in FIG. 2, each ACK/NACK transmission 240 sent from user device 120 to base station 110 over the PUSCH or the PUCCH may include multiple ACK/NACK responses, corresponding to multiple data transmissions received from the base station, bundled or combined together.

Each data transmission may either succeed or fail. Usually, an ACK response indicates that the data transmission has succeeded, and a NACK response indicates that the data transmission has, for whatever reason, failed. Thus, each data transmission needs two states (e.g., ACK or NACK) for its response. For clarification purposes, hereafter, let ACK be represented as "1" and NACK be represented as "0". Of course, other values (e.g., TRUE or FALSE) may be used to represent ACK and NACK.

For a single response to a single data transmission (no bundling), two states are needed to represent all of the possible ACK/NACK responses: (0), (1). For example, the "(0)" state, corresponding to NACK, indicates that the data transmission has failed; and the "(1)" state, corresponding to ACK, indicates that the data transmission has succeeded.

For two responses to two data transmissions combined together, four states are needed to represent all of the possible ACK/NACK responses: (0, 0), (0, 1), (1, 0), (1, 1). The two digits correspond to the two ACK/NACK responses respectively. For example, assume that the first digit corresponds to the first data transmission; and the second digit corresponds to the second data transmission. Then, the "(0, 0)" state indicates that both data transmissions have failed; the "(0, 1)" state may indicate that the first data transmission has failed but the second data transmission has succeeded; the "(1, 0)" state may indicate that the first data transmission has succeeded but the second data transmission has failed; and the "(1, 1)" state indicates that both data transmissions have succeeded.

For three responses to three data transmissions combined together, eight states are needed to represent all of the possible ACK/NACK responses: (0, 0, 0), (0, 0, 1), (0, 1, 0), (0, 1, 1), (1, 0, 0), (1, 0, 1), (1, 1, 0), (1, 1, 1). The three digits correspond to the three ACK/NACK responses respectively. For example, assume that the first digit corresponds to the first data transmission; the second digit corresponds to the second data transmission; and the third digit corresponds to the third data transmission. Then, the "(0, 0, 0)" state indicates that all three data transmissions have failed; the "(0, 0, 1)" state may indicate that the first and second data transmissions have failed but the third data transmission has succeeded; the "(0, 1, 0)" state may indicate that the first and third data transmissions have failed but the second data transmission has succeeded; the "(0, 1, 1)" state may indicate that the first data transmission has failed but the second and third data transmissions have succeeded; the "(1, 0, 0)" state may indicate that the first data transmission has succeeded but the second and third data transmissions have failed; the "(1, 0, 1)" state may indicate that the first and third data transmissions have succeeded but the second data transmission has failed; the "(1, 1, 0)" state may indicate that the first and second data transmissions have succeeded but the third data transmission has failed; and the "(1, 1, 1)" state indicates that all three data transmissions have succeeded.

For four responses to four data transmissions combined together, sixteen states are needed to represent all of the possible ACK/NACK responses: (0, 0, 0, 0), (0, 0, 0, 1), (0, 0, 1, 0), (0, 0, 1, 1), (0, 1, 0, 0), (0, 1, 0, 1), (0, 1, 1, 0), (0, 1, 1, 1), (1, 0, 0, 0), (1, 0, 0, 1), (1, 0, 1, 0), (1, 0, 1, 1), (1, 1, 0, 0), (1, 1, 0, 1), (1, 1, 1, 0), (1, 1, 1, 1). The four digits correspond to the four ACK/NACK responses respectively. For example, assume that the first digit corresponds to the first data transmission; the second digit corresponds to the second data transmission; the third digit corresponds to the third data transmission; and the fourth digit corresponds to the fourth data transmission. Then, the "(0, 0, 0, 0)" state indicates that all four data transmissions have failed; the "(0, 0, 0, 1)" state may indicate that the first, second, and third data transmissions have failed but the fourth data transmission has succeeded; the "(0, 0, 1, 0)" state may indicate that the first, second, and fourth data transmissions have failed but the third data transmission has succeeded; the "(0, 0, 1, 1)" state may indicate that the first and second data transmissions have failed but the third and fourth data transmissions have succeeded; the "(0, 1, 0, 0)" state may indicate that the first, third, and fourth data transmissions have failed but the second data transmission has succeeded; the "(0, 1, 0, 1)" state may indicate that the first and third data transmissions have failed but the second and fourth data transmissions have succeeded; the "(0, 1, 1, 0)" state may indicate that the first and fourth data transmissions have failed but the second and third data transmissions have succeeded; the "(0, 1, 1, 1)" state may indicate the first data transmission has failed but the second, third, and fourth data transmissions have succeeded; the "(1, 0, 0, 0)" state may indicate the first data transmission has succeeded but the second, third, and fourth data transmissions have failed; the "(1, 0, 0, 1)" state may indicate that the first and fourth data transmissions have succeeded but the second and third data transmissions have failed; the "(1, 0, 1, 0)" state may indicate that the first and third data transmissions have succeeded but the second and fourth data transmissions have failed; the "(1, 0, 1, 1)" state may indicate that the first, third and fourth data transmissions have succeeded but the second data transmission has failed; the "(1, 1, 0, 0)" state may indicate that the first and second data transmissions have succeeded but the third and fourth data transmissions have failed; the "(1, 1, 0, 1)" state may indicate that the first, second, and fourth data transmissions have succeeded but the third data transmission has failed; the "(1, 1, 1, 0)" state may indicate that the first, second, and third data transmissions have succeeded but the fourth data transmission has failed; and the "(1, 1, 1, 1)" state indicates that all four data transmissions have succeeded.

In general, for N responses to N data transmissions combined together, a total of $2^N$ states are needed to represent all the possible ACK/NACK responses. Consequently, N bits are needed to encode the $2^N$ states.

In the Long Term Evolution (LTE) standard, and more recently, in the LTE Advanced standard, bundling of ACK/NACK responses may be used. In particular embodiments, a user device may bundle N ACK/NACK responses, corresponding to N data transmissions received from a base station, together and sends the bundled or combined N ACK/NACK responses back to the base station over the PUSCH or the PUCCH as a single ACK/NACK transmission. However, the number of bits that may be transmitted over the PUSCH or the PUCCH in each transmission may be limited by the bandwidth of the PUSCH or the PUCCH, respectively. Currently, one or two bits may be transmitted over the PUSCH or the PUCCH during each transmission, although the bandwidth of the PUSCH or the PUCCH may increase. One bit may represent up to two states (i.e., (0), (1)), while two bits may represent up to four states (i.e., (0, 0), (0, 1), (1, 0), (1, 1)). Thus, if only using the bits transmitted over the PUSCH to encode the bundled ACK/NACK responses, then in the one-bit case, no bundling may be done, and in the two-bit case, only two ACK/NACK responses corresponding to two data transmissions may be bundled in a single ACK/NACK transmission.

In particular embodiments, the PUSCH may have multiple resources in the time and/or frequency domain at which the ACK/NACK responses may be sent. These different resources may be referred to as "positions" of the PUSCH. Thus, each position corresponds to a specific frequency/time combination in the PUSCH. Each transmission is sent at a specific position of the PUSCH. In particular embodiments, in addition to the data bits actually sent over the PUSCH during each ACK/NACK transmission (e.g., the data bits sent by a user device to a base station over the PUSCH), the position of the PUSCH at which the ACK/NACK transmission is sent is also selected and used to encode the combined ACK/NACK responses.

In particular embodiments, suppose that the PUSCH has two positions, 0 and 1, corresponding to two frequencies, at which the ACK/NACK transmissions may be sent. Further suppose that only one bit may be sent over the PUSCH during each transmission. If using only the one bit to encode and send the ACK/NACK responses over the PUSCH, then no bundling may be done, because, as describe above, it takes two states (e.g., (0) and (1)) to represent all the possible ACK/NACK responses for a single data transmission, and it takes one bit to encode two states. However, if signaling by choosing which position of the PUSCH to use and sending the one bit over the selected PUSCH position to encode the ACK/NACK responses, then two ACK/NACK responses may be combined into a single ACK/NACK transmission. As described above, it takes four states to represent all the possible responses of the two bundled ACK/NACK responses. The following TABLE 1A illustrates an example of using both the two positions of the PUSCH and the single bit sent over the PUSCH to encode the four possible states of two bundled ACK/NACK responses.

TABLE 1A

BUNDLING TWO ACK/NACK RESPONSES

| ACK/NACK State | PUSCH Position | Bit Value |
|---|---|---|
| (0, 0) | 0 | 0 |
| (0, 1) | 0 | 1 |
| (1, 0) | 1 | 0 |
| (1, 1) | 1 | 1 |

Based on the encoding scheme illustrated in TABLE 1A, to encode the "(0, 0)" state, which indicates that both data transmissions have failed, the PUSCH position is selected to be position 0, and the value of the bit sent over the PUSCH is set to be 0. To encode the "(0, 1)" state, which may indicate that the first data transmission has failed but the second data transmission has succeeded, the PUSCH position is selected to be position 0, and the value of the bit sent over the PUSCH is set to be 1. To encode the "(1, 0)" state, which may indicate that the first data transmission has succeeded but the second data transmission has failed, the PUSCH position is selected to be position 1, and the value of the bit sent over the PUSCH is set to be 0. And to encode the "(1, 1)" state, which indicates that both data transmissions have succeeded, the PUSCH position is selected to be position 1, and the value of the bit sent over the PUSCH is set to be 1.

Of course, which specific state of the four possible states should be used depends on the actual status of the two data transmissions to which the two combined ACK/NACK responses correspond. For example, suppose that a user device has received two data transmissions from a base station and chooses to combine the two ACK/NACK responses corresponding to the two received data transmission. Again, if both data transmissions have been successful, the user device should select the "(1, 1)" state; if both data transmissions have failed, the user device should select the "(0, 0)" state; and so on. In particular embodiments, the user device may select the position of the PUSCH and set the value of the bit sent over the PUSCH according to the specific state selected (e.g., using the scheme illustrate in TABLE 1A). The user device may then send the one bit having the value set based on the selected state over the PUSCH at the position selected based on the selected state to the base station. The base station, upon receiving the ACK/NACK transmission from the user device, may examine the value of the bit sent over the PUSCH as well as the position or frequency of the PUSCH at which the bit is sent. Based on both information, the base station may decode the two combined ACK/NACK responses.

Note that in the example illustrated in TABLE 1A, the positions of the PUSCH correspond to the first digit of the ACK/NACK states, and the bit sent over the PUSCH corresponds to the second digit of the ACK/NACK states. In an alternative example, the bit sent over the PUSCH may correspond to the first digit of the ACK/NACK states, and the positions of the PUSCH may correspond to the second digit of the ACK/NACK states, as illustrated in TABLE 1B.

TABLE 1B

BUNDLING TWO ACK/NACK RESPONSES

| ACK/NACK State | Bit Value | PUSCH Position |
|---|---|---|
| (0, 0) | 0 | 0 |
| (0, 1) | 0 | 1 |
| (1, 0) | 1 | 0 |
| (1, 1) | 1 | 1 |

Based on the encoding scheme illustrated in TABLE 1B, to encode the "(0, 0)" state, the value of the bit sent over the PUSCH is set to be 0, and the PUSCH position is selected to be position 0. To encode the "(0, 1)" state, the value of the bit sent over the PUSCH is set to be 0, and the PUSCH position is selected to be position 1. To encode the "(1, 0)" state, the value of the bit sent over the PUSCH is set to be 1, and the PUSCH position is selected to be position 0. To encode the "(1, 1)" state, the value of the bit sent over the PUSCH is set to be 1, and the PUSCH position is selected to be position 1.

In particular embodiments, user devices and base stations may agree upon a specific scheme to encode and decode the combined ACK/NACK responses.

In particular embodiments, suppose that the PUSCH has three positions, 0, 1, and 2, corresponding to three frequencies, at which the ACK/NACK transmissions may be sent. Further suppose that only one bit may be sent over the PUSCH during each transmission. Assume that three ACK/NACK responses, corresponding to three data transmissions, are bundled or combined together. As described above, it takes eight states to represent all the possible responses of the three bundled ACK/NACK responses. The following TABLE 2A illustrates an example of using both the three positions of the PUSCH and the one bit sent over the PUSCH to encode the eight possible states of the three bundled ACK/NACK responses. In this case, the positions of the PUSCH correspond to the first and second digit of the ACK/NACK states, and the bit sent over the PUSCH corresponds to the third digit of the ACK/NACK states.

TABLE 2A

BUNDLING THREE ACK/NACK RESPONSES

| ACK/NACK State | PUSCH Position | Bit Value |
|---|---|---|
| (0, 0, 0) | 0 | 0 |
| (0, 0, 1) | 0 | 1 |
| (0, 1, 0) | 0 | 0 |
| (0, 1, 1) | 0 | 1 |
| (1, 0, 0) | 1 | 0 |
| (1, 0, 1) | 1 | 1 |

TABLE 2A-continued

BUNDLING THREE ACK/NACK RESPONSES

| ACK/NACK State | PUSCH Position | Bit Value |
|---|---|---|
| (1, 1, 0) | 2 | 0 |
| (1, 1, 1) | 2 | 1 |

Based on the encoding scheme illustrated in TABLE 2A, to encode the "(0, 0, 0)" state, which indicates that all three data transmissions have failed, the position of the PUSCH is selected to be position 0, and the value of the bit sent over the PUSCH is set to be 0. To encode the "(0, 0, 1)" state, which may indicate that the first and second data transmissions have failed but the third data transmission has succeeded, the position of the PUSCH is selected to be position 0, and the value of the bit sent over the PUSCH is set to be 1. To encode the "(0, 1, 0)" state, which may indicate that the first and third data transmissions have failed but the second data transmission has succeeded, the position of the PUSCH is selected to be position 0, and the value of the bit sent over the PUSCH is set to be 0. To encode the "(0, 1, 1)" state, which may indicate that the first data transmission has failed but the second and third data transmissions have succeeded, the position of the PUSCH is selected to be position 0, and the value of the bit sent over the PUSCH is set to be 1. To encode the "(1, 0, 0)" state, which may indicate that the first data transmission has succeeded but the second and third data transmissions have failed, the position of the PUSCH is selected to be position 1, and the value of the bit sent over the PUSCH is set to be 0. To encode the "(1, 0, 1)" state, which may indicate that the first and third data transmissions have succeeded but the second data transmission has failed, the position of the PUSCH is selected to be position 1, and the value of the bit sent over the PUSCH is set to be 1. To encode the "(1, 1, 0)" state, which may indicate that the first and second data transmissions have succeeded but the third data transmission has failed, the position of the PUSCH is selected to be position 2, and the value of the bit sent over the PUSCH is set to be 0. To encode the "(1, 1, 1)" state, which indicates that all three data transmissions have succeeded, the position of the PUSCH is selected to be position 2, and the value of the bit sent over the PUSCH is set to be 1.

Note that in TABLE 2A, the two states "(0, 0, 0)" and "(0, 1, 0)" have the same encoding: PUSCH position 0 and bit value 0. The two states "(0, 0, 1)" and "(0, 1, 1)" have the same encoding: PUSCH position 0 and bit value 1. As described above, it takes at least three bits to encode the eight possible states for the three bundled ACK/NACK responses. In general, if there are K positions in the PUSCH, the K positions may provide $\lfloor \log_2 K \rfloor$ bits. Thus, three positions, as in the example illustrated in TABLE 2A, may provide one bit. In addition, only one bit may be sent over the PUSCH during each transmission. The total number of bits available to encode the eight states is two, which is not sufficient. As a result, two or more states may share the same encoding, as illustrated in TABLE 2A. In this example, suppose that a base station receives an ACK/NACK transmission that includes three combined ACK/NACK responses encoded using the scheme illustrated in TABLE 2A. If the position of the PUSCH at which the ACK/NACK transmission is sent is position 0 and the bit value sent over the PUSCH is 0, then the base station cannot distinguish whether it represents the "(0, 0, 0)" state or the "(0, 1, 0)" state. The base station may need to resend all three data transmissions. Similarly, if the position of the PUSCH at which the ACK/NACK transmission is sent is position 0 and the bit value sent over the PUSCH is 1, then the base station cannot distinguish whether it represents the "(0, 0, 1)" state or the "(0, 1, 1)" state. The base station may need to resend the first and second data transmissions.

Alternatively, in particular embodiments, suppose that the PUSCH has three positions, 0, 1, and 2, corresponding to three frequencies, at which the ACK/NACK transmissions may be sent. Further suppose that two bits may be sent over the PUSCH during each transmission. Assume that three ACK/NACK responses, corresponding to three data transmissions, are bundled or combined together. The following 2B illustrates an example of using both the three positions of the PUSCH and the two bits sent over the PUSCH to encode the eight possible states of the three bundled ACK/NACK responses. In this case, the positions of the PUSCH correspond to the first digit of the ACK/NACK states, and the two bits sent over the PUSCH respectively correspond to the second and third digit of the ACK/NACK states.

TABLE 2B

BUNDLING THREE ACK/NACK RESPONSES

| ACK/NACK State | PUSCH Position | Bit Value |
|---|---|---|
| (0, 0, 0) | 0 | 0, 0 |
| (0, 0, 1) | 0 | 0, 1 |
| (0, 1, 0) | 0 | 1, 0 |
| (0, 1, 1) | 0 | 1, 1 |
| (1, 0, 0) | 1 | 0, 0 |
| (1, 0, 1) | 1 | 0, 1 |
| (1, 1, 0) | 1 | 1, 0 |
| (1, 1, 1) | 1 | 1, 1 |

Based on the encoding scheme illustrated in TABLE 2B, to encode the "(0, 0, 0)" state, the position of the PUSCH is selected to be position 0, and the values of the two bits sent over the PUSCH are set to be 0 and 0 respectively. To encode the "(0, 0, 1)" state, the position of the PUSCH is selected to be position 0, and the values of the two bits sent over the PUSCH are set to be 0 and 1 respectively. To encode the "(0, 1, 0)" state, the position of the PUSCH is selected to be position 0, and the values of the two bits sent over the PUSCH are set to be 1 and 0 respectively. To encode the "(0, 1, 1)" state, the position of the PUSCH is selected to be position 0, and the values of the two bits sent over the PUSCH are set to be 1 and 1 respectively. To encode the "(1, 0, 0)" state, the position of the PUSCH is selected to be position 1, and the values of the two bits sent over the PUSCH are set to be 0 and 0 respectively. To encode the "(1, 0, 1)" state, the position of the PUSCH is selected to be position 1, and the values of the two bits sent over the PUSCH are set to be 0 and 1 respectively. To encode the "(1, 1, 0)" state, the position of the PUSCH is selected to be position 1, and the values of the two bits sent over the PUSCH are set to be 1 and 0 respectively. To encode the "(1, 1, 1)" state, the position of the PUSCH is selected to be position 1, and the values of the two bits sent over the PUSCH are set to be 1 and 1 respectively.

In this case, the three positions of the PUSCH provides one bit. In addition, there are two bits sent over the PUSCH. Thus, there are sufficient number of bits to encode all eight possible states of the three bundled ACK/NACK responses uniquely.

Alternatively, in particular embodiments, suppose that the PUSCH has four positions, 0, 1, 2, and 3, corresponding to four frequencies, at which the ACK/NACK transmissions may be sent. Further suppose that only one bit may be sent over the PUSCH during each transmission. Assume that three ACK/NACK responses, corresponding to three data transmissions, are bundled or combined together. The following TABLE 2C illustrates an example of using both the four positions of the PUSCH and the one bit sent over the PUSCH to encode the eight possible states of the three bundled ACK/NACK responses. In this example, the positions of the PUSCH correspond to the first and second digit of the ACK/NACK states, and the bit sent over the PUSCH corresponds to the third digit of the ACK/NACK states.

TABLE 2C

BUNDLING THREE ACK/NACK RESPONSES

| ACK/NACK State | PUSCH Position | Bit Value |
|---|---|---|
| (0, 0, 0) | 0 | 0 |
| (0, 0, 1) | 0 | 1 |
| (0, 1, 0) | 1 | 0 |
| (0, 1, 1) | 1 | 1 |
| (1, 0, 0) | 2 | 0 |
| (1, 0, 1) | 2 | 1 |
| (1, 1, 0) | 3 | 0 |
| (1, 1, 1) | 3 | 1 |

Based on the encoding scheme illustrated in TABLE 2C, to encode the "(0, 0, 0)" state, the position of the PUSCH is selected to be position 0, and the value of the bit sent over the PUSCH is set to be 0. To encode the "(0, 0, 1)" state, the position of the PUSCH is selected to be position 0, and the value of the bit sent over the PUSCH is set to be 1. To encode the "(0, 1, 0)" state, the position of the PUSCH is selected to be position 1, and the value of the bit sent over the PUSCH is set to be 0. To encode the "(0, 1, 1)" state, the position of the PUSCH is selected to be position 1, and the value of the bit sent over the PUSCH is set to be 1. To encode the "(1, 0, 0)" state, the position of the PUSCH is selected to be position 2, and the value of the bit sent over the PUSCH is set to be 0. To encode the "(1, 0, 1)" state, the position of the PUSCH is selected to be position 2, and the value of the bit sent over the PUSCH is set to be 1. To encode the "(1, 1, 0)" state, the position of the PUSCH is selected to be position 3, and the value of the bit sent over the PUSCH is set to be 0. To encode the "(1, 1, 1)" state, the position of the PUSCH is selected to be position 3, and the value of the bit sent over the PUSCH is set to be 1.

In this case, the four positions of the PUSCH provide two bits. In addition, there is one bit sent over the PUSCH. Thus, there are sufficient number of bits to encode all eight possible states of the three bundled ACK/NACK responses uniquely.

Alternatively, in particular embodiments, suppose that the PUSCH has four positions, 0, 1, 2, and 3, corresponding to four frequencies, at which the ACK/NACK transmissions may be sent. Further suppose that only one bit may be sent over the PUSCH during each transmission. Assume that four ACK/NACK responses, corresponding to four data transmissions, are bundled or combined together. As described above, there are sixteen possible states for the four bundled ACK/NACK responses, and it takes at least four bits to encode these sixteen possible states. The following TABLE 3A illustrates an example of using both the four positions of the PUSCH and the one bit sent over the PUSCH to encode the sixteen possible states of the four bundled ACK/NACK responses. In this case, the four positions of the PUSCH provide two bits. In addition, there is one bit sent over the PUSCH. Thus, the total number of bits available is three. However, it takes at least four bits to encode the sixteen possible states of the four bundled ACK/NACK responses. Since there are insufficient number of bits to uniquely encode all sixteen possible states, two or more states may have the same encoding.

TABLE 3A

BUNDLING FOUR ACK/NACK RESPONSES

| ACK/NACK State | PUSCH Position | Bit Value |
|---|---|---|
| (0, 0, 0, 0) | 0 | 0 |
| (0, 0, 0, 1) | 0 | 0 |
| (0, 0, 1, 0) | 1 | 0 |
| (0, 0, 1, 1) | 1 | 0 |
| (0, 1, 0, 0) | 2 | 0 |
| (0, 1, 0, 1) | 2 | 0 |
| (0, 1, 1, 0) | 3 | 0 |
| (0, 1, 1, 1) | 3 | 0 |
| (1, 0, 0, 0) | 0 | 1 |
| (1, 0, 0, 1) | 0 | 1 |
| (1, 0, 1, 0) | 1 | 1 |
| (1, 0, 1, 1) | 1 | 1 |
| (1, 1, 0, 0) | 2 | 1 |
| (1, 1, 0, 1) | 2 | 1 |
| (1, 1, 1, 0) | 3 | 1 |
| (1, 1, 1, 1) | 3 | 1 |

Based on the encoding scheme illustrated in TABLE 3A, to encode both the "(0, 0, 0, 0)" and the "(0, 0, 0, 1)" state, the position of the PUSCH is selected to be position 0, and the value of the bit sent over the PUSCH is set to be 0. To encode both the "(0, 0, 1, 0)" and the "(0, 0, 1, 1)" state, the position of the PUSCH is selected to be position 1, and the value of the bit sent over the PUSCH is set to be 0. To encode both the "(0, 1, 0, 0)" and the "(0, 1, 0, 1)" state, the position of the PUSCH is selected to be position 2, and the value of the bit sent over the PUSCH is set to be 0. To encode both the "(0, 1, 1, 0)" and the "(0, 1, 1, 1)" state, the position of the PUSCH is selected to be position 3, and the value of the bit sent over the PUSCH is set to be 0. To encode both the "(1, 0, 0, 0)" and the "(1, 0, 0, 1)" state, the position of the PUSCH is selected to be position 0, and the value of the bit sent over the PUSCH is set to be 1. To encode both the "(1, 0, 1, 0)" and the "(1, 0, 1, 1)" state, the position of the PUSCH is selected to be position 1, and the value of the bit sent over the PUSCH is set to be 1. To encode both the "(1, 1, 0, 0)" and the "(1, 1, 0, 1)" state, the position of the PUSCH is selected to be position 2, and the value of the bit sent over the PUSCH is set to be 1. To encode both the "(1, 1, 1, 0)" and the "(1, 1, 1, 1)" state, the position of the PUSCH is selected to be position 3, and the value of the bit sent over the PUSCH is set to be 1.

In the example illustrated in TABLE 3A, because the sixteen states are not uniquely encoded, when a base station receives an ACK/NACK transmission encoded using such a scheme, the base station may not be able to uniquely determine which state it represents. For example, suppose that a base station receives an ACK/NACK transmission that includes four combined ACK/NACK responses encoded using the scheme illustrated in TABLE 3A. If the position of the PUSCH at which the ACK/NACK transmission is sent is position 0 and the bit value sent over the PUSCH is 0, then the base station cannot distinguish whether it represents the "(0, 0, 0, 0)" state or the "(0, 0, 1, 0)" state. The base station may need to resend all four data transmissions. If the position of the PUSCH at which the ACK/NACK transmission is sent is position 1 and the bit value sent over the PUSCH is 1, then the base station cannot distinguish whether it represents the "(1, 0, 1, 0)" state or the "(1, 0, 1, 1)" state. The base station may need to resend the second and fourth data transmissions. If the position of the PUSCH at which the ACK/NACK transmission is sent is position 3 and the bit value sent over the PUSCH is 1, then the base station cannot distinguish whether it represents the "(1, 1, 1, 0)" state or the "(1, 1, 1, 1)" state. The base station may need to resend the fourth data transmission.

Alternatively, in particular embodiments, suppose that the PUSCH has four positions, 0, 1, 2, and 3, corresponding to four frequencies, at which the ACK/NACK transmissions may be sent. Further suppose that two bits may be sent over the PUSCH during each transmission. Assume that four ACK/NACK responses, corresponding to four data transmissions, are bundled or combined together. The following TABLE 3B illustrates an example of using both the four positions of the PUSCH and the two bits sent over the PUSCH to encode the sixteen possible states of the three bundled ACK/NACK responses. In this case, the positions of the PUSCH correspond to the first and second digit of the ACK/NACK states, and the two bits sent over the PUSCH respectively correspond to the third and fourth digit of the ACK/NACK states. The four positions of the PUSCH provides two bits. In addition, two bits are transmitted over the PUSCH during each transmission. Thus, there are sufficient number of bits to uniquely encode all sixteen position states of the four bundled ACK/NACK responses.

TABLE 3B

BUNDLING FOUR ACK/NACK RESPONSES

| ACK/NACK State | PUSCH Position | Bit Value |
| --- | --- | --- |
| (0, 0, 0, 0) | 0 | 0, 0 |
| (0, 0, 0, 1) | 0 | 0, 1 |
| (0, 0, 1, 0) | 0 | 1, 0 |
| (0, 0, 1, 1) | 0 | 1, 1 |
| (0, 1, 0, 0) | 1 | 0, 0 |
| (0, 1, 0, 1) | 1 | 0, 1 |
| (0, 1, 1, 0) | 1 | 1, 0 |
| (0, 1, 1, 1) | 1 | 1, 1 |
| (1, 0, 0, 0) | 2 | 0, 0 |
| (1, 0, 0, 1) | 2 | 0, 1 |
| (1, 0, 1, 0) | 2 | 1, 0 |
| (1, 0, 1, 1) | 2 | 1, 1 |
| (1, 1, 0, 0) | 3 | 0, 0 |
| (1, 1, 0, 1) | 3 | 0, 1 |
| (1, 1, 1, 0) | 3 | 1, 0 |
| (1, 1, 1, 1) | 3 | 1, 1 |

Based on the encoding scheme illustrated in TABLE 3B, to encode the "(0, 0, 0, 0)" state, the position of the PUSCH is selected to be position 0, and the values of the two bits sent over the PUSCH are set to be 0 and 0 respectively. To encode the "(0, 0, 0, 1)" state, the position of the PUSCH is selected to be position 0, and the values of the two bits sent over the PUSCH are set to be 0 and 1 respectively. To encode the "(0, 0, 1, 0)" state, the position of the PUSCH is selected to be position 0, and the values of the two bits sent over the PUSCH are set to be 1 and 0 respectively. To encode the "(0, 0, 1, 1)" state, the position of the PUSCH is selected to be position 0, and the values of the two bits sent over the PUSCH are set to be 1 and 1 respectively. To encode the "(0, 1, 0, 0)" state, the position of the PUSCH is selected to be position 1, and the values of the two bits sent over the PUSCH are set to be 0 and 0 respectively. To encode the "(0, 1, 0, 1)" state, the position of the PUSCH is selected to be position 1, and the values of the two bits sent over the PUSCH are set to be 0 and 1 respectively. To encode the "(0, 1, 1, 0)" state, the position of the PUSCH is selected to be position 1, and the values of the two bits sent over the PUSCH are set to be 1 and 0 respectively. To encode the "(0, 1, 1, 1)" state, the position of the PUSCH is selected to be position 1, and the values of the two bits sent over the PUSCH are set to be 1 and 1 respectively. To encode the "(1, 0, 0, 0)" state, the position of the PUSCH is selected to be position 2, and the values of the two bits sent over the PUSCH are set to be 0 and 0 respectively. To encode the "(1, 0, 0, 1)" state, the position of the PUSCH is selected to be position 2, and the values of the two bits sent over the PUSCH are set to be 0 and 1 respectively. To encode the "(1, 0, 1, 0)" state, the position of the PUSCH is selected to be position 2, and the values of the two bits sent over the PUSCH are set to be 1 and 0 respectively. To encode the "(1, 0, 1, 1)" state, the position of the PUSCH is selected to be position 2, and the values of the two bits sent over the PUSCH are set to be 1 and 1 respectively. To encode the "(1, 1, 0, 0)" state, the position of the PUSCH is selected to be position 3, and the values of the two bits sent over the PUSCH are set to be 0 and 0 respectively. To encode the "(1, 1, 0, 1)" state, the position of the PUSCH is selected to be position 3, and the values of the two bits sent over the PUSCH are set to be 0 and 1 respectively. To encode the "(1, 1, 1, 0)" state, the position of the PUSCH is selected to be position 3, and the values of the two bits sent over the PUSCH are set to be 1 and 0 respectively. To encode the "(1, 1, 1, 1)" state, the position of the PUSCH is selected to be position 3, and the values of the two bits sent over the PUSCH are set to be 1 and 1 respectively.

The above tables illustrate several example schemes for encoding the possible states of two, three, or four bundled ACK/NACK responses using the positions of the PUSCH and the bits sent over the PUSCH. Of course, other encoding schemes may also be used. In theory, the encoding schemes described above provide a way to distinguish M states (i.e., the possible states of the N bundled ACK/NACK responses), and these M states may be used for sending any of $\lfloor \log_2 M \rfloor$ bits. The states of one particular encoding scheme may be permutated to generate other encoding schemes. For example, the positions of the PUSCH and the bits sent over the PUSCH may correspond to different digits in the states of the bundled ACK/NACK responses, and the digits in the states may correspond to different ACK/NACK responses.

Figure 3:
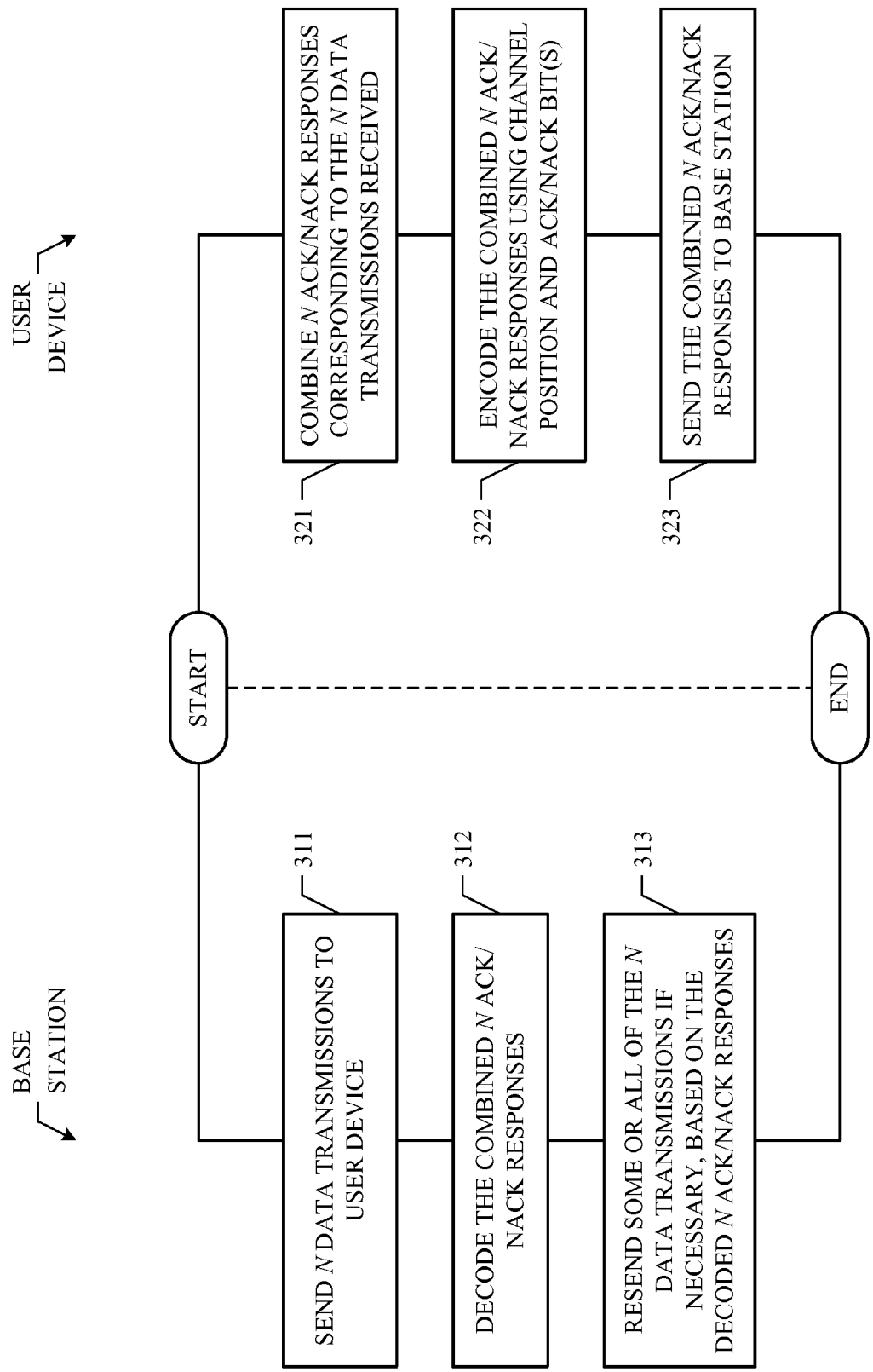
FIG. 3 illustrates an example method for bundling multiple ACK/NACK responses into a single ACK/NACK transmission.

FIG. 3 illustrates an example method for bundling multiple ACK/NACK responses into a single ACK/NACK transmission using, for example, one of the encoding schemes described above. In particular embodiments, some of the steps illustrated in FIG. 3 may be performed by a base station, while other steps may be performed by a user device (e.g., a mobile device). In particular embodiments, the user device may be connected with the base station wirelessly.

In particular embodiments, a base station may send N data transmissions to a user device, as illustrated in STEP 311. N may be any positive integer. For example, N may be 2, 3, or 4. The user device may provide an ACK/NACK response to each of the N data transmissions received from the base station. An ACK response may indicate to the base station that the corresponding data transmission has been successful, while a NACK response may indicate to the base station that the corresponding data transmission has failed, in which case the base station may resend the corresponding data transmission.

In particular embodiments, instead of sending each ACK/NACK response separately to the base station, the user device may combine N ACK/NACK responses, corresponding to the N data transmissions received from the base station, into a single ACK/NACK transmission, as illustrated in STEP 321. There may be N digits representing the combined N ACK/NACK responses, each digit corresponding to a specific ACK/NACK response, which in turn corresponding to a specific data transmission received from the base station. For example, suppose that the ith digit corresponds to the ith ACK/NACK response, which in turn corresponds to the ith data transmission. If the ith data transmission has succeeded, then the ith digit may be set to 1, representing an ACK response to the data transmission. On the other hand, if the ith data transmission has failed, then the ith digit may be set to 0, representing a NACK response to the data transmission.

In particular embodiments, the N digits, and more specifically, the N binary digits, representing the combined N ACK/NACK responses may be encoded using the positions of the communication channel for sending the ACK/NACK transmissions and the bits actually sent over the communication channel from the user device to the base station, as illustrated in STEP 322. For example, if N is 2, then the two digits may be encoded using the example scheme illustrated in TABLE 1A or TABLE 1B. If N is 3, then the three digits may be encoded using the example scheme illustrated in TABLE 2A or TABLE 2B or TABLE 2C. If N is 4, then the four digits may be encoded using the example scheme illustrated in TABLE 3A or TABLE 3B. Other encoding schemes may also be possible, and this disclosure contemplates any applicable encoding schemes. For example, the user device and the base station may select and agree upon a specific encoding scheme based on: (1) the number of ACK/NACK responses combined together into a single ACK/NACK transmission; (2) the number of positions, corresponding to different frequencies, available in the communication channel (e.g., PUSCH) for sending the ACK/NACK transmissions; or (3) the number of bits that may be sent over the communication channel during each transmission.

In particular embodiments, the user device may send the combined N ACK/NACK responses to the base station, as illustrated in STEP 323. More specifically, the user device may select a specific position in the communication channel and set the value of each bit sent over the communication channel based on the encoding scheme used. Then the user device may send the bit value(s) at the selected position over the communication channel.

The base station, upon receiving the bit(s) sent at the selected position over the communication channel, may decode the combined N ACK/NACK responses using both the selected position of the communication channel and the bit value(s) received, as illustrated in STEP 312. The decoding of the combined N ACK/NACK responses may be done based on the encoding scheme used by the user device to encode the combined N ACK/NACK responses, as described above. Based on the decoded N ACK/NACK responses, the base station may resend some or all of the N data transmissions to the user device, if necessary, as illustrated in STEP 313. For example, if in the decoded N ACK/NACK responses, a specific digit is 0, then the data transmission corresponding to that digit may be resent to the user device.

Figure 4:
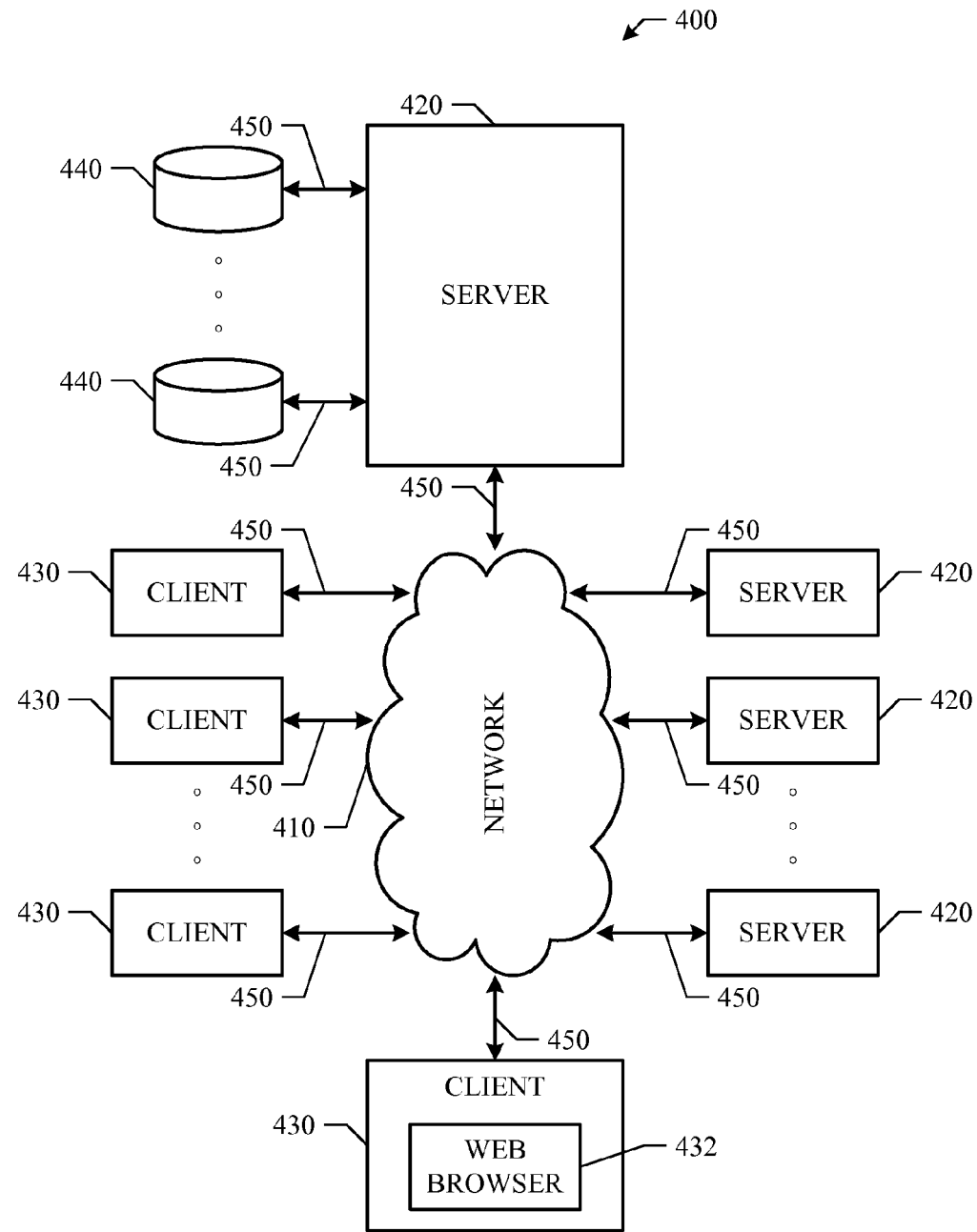
FIG. 4 illustrates an example network environment.

Particular embodiments may be implemented in a network environment. FIG. 4 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. This disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. This disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiments, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. This disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVAS- CRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
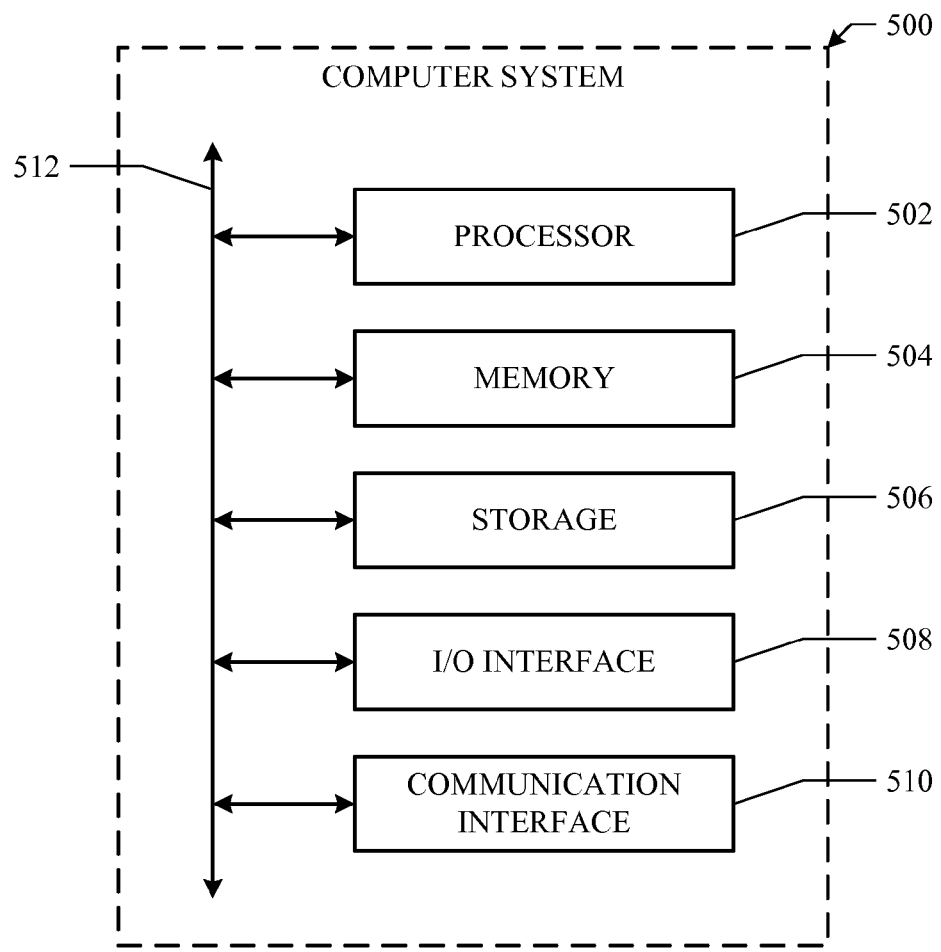
FIG. 5 illustrates an example computer system.

Particular embodiments may be implemented on one or more computer systems. FIG. 5 illustrates an example computer system 500. For example, computer system 500 may be a user device or mobile device capable of wireless communications. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by a first computing device,
   combining N ACK/NACK responses respectively corresponding to N data transmissions received from a second computing device;
   encoding the combined N ACK/NACK responses, comprising:
      selecting one of one or more positions of a communication channel between the first computing device and the second computing device based on the combined N ACK/NACK responses, wherein the first computing device sends ACK/NACK transmissions to the second computing device over the communication channel, and each position of the communication channel corresponds to a frequency or time resource of the communication channel; and
      setting a value of each of one or more bits the first computing device sends to the second computing device during each ACK/NACK transmission based on the combined N ACK/NACK responses; and
   sending the one or more bits at the selected one of one or more positions over the communication channel to the second computing device;
   wherein:
      combining N ACK/NACK responses respectively corresponding to N data transmissions received from the second computing device comprises:
         representing the N ACK/NACK responses with N binary digits;
         if an ith data transmission of the N data transmissions is successful, then setting an ith binary digit of the N binary digits to 1, wherein positions of the ith data transmission and the ith binary digit are equal; and
         if the ith data transmission is unsuccessful, then setting the ith binary digit to 0;
      N is 2;
      a number of positions of the communication channel is 2;
      a number of bits sent during each ACK/NACK transmission is 1;
      if the 2 binary digits are (0, 0), then a first position of the communication channel is selected and the value of the bit is set to 0;
      if the 2 binary digits are (0, 1), then a first position of the communication channel is selected and the value of the bit is set to 1;
      if the 2 binary digits are (1, 0), then a second position of the communication channel is selected and the value of the bit is set to 0; and
      if the 2 binary digits are (1, 1), then a second position of the communication channel is selected and the value of the bit is set to 1.

2. The method of claim 1, wherein encoding the combined N ACK/NACK responses comprises:
   selecting the one position based on one or more first binary digits of the N binary digits; and
   setting the value of each of the bits based on one or more second binary digits of the N binary digits.

3. A method comprising: by a first computing device,
   combining N ACK/NACK responses respectively corresponding to N data transmissions received from a second computing device;
   encoding the combined N ACK/NACK responses, comprising:
      selecting one of one or more positions of a communication channel between the first computing device and the second computing device based on the combined N ACK/NACK responses, wherein the first computing device sends ACK/NACK transmissions to the second computing device over the communication channel, and each position of the communication channel corresponds to a frequency or time resource of the communication channel; and
      setting a value of each of one or more bits the first computing device sends to the second computing device during each ACK/NACK transmission based on the combined N ACK/NACK responses; and
   sending the one or more bits at the selected one of one or more positions over the communication channel to the second computing device;
   wherein:
      combining N ACK/NACK responses respectively corresponding to N data transmissions received from the second computing device comprises:
         representing the N ACK/NACK responses with N binary digits;
         if an ith data transmission of the N data transmissions is successful, then setting an ith binary digit of the N binary digits to 1, wherein positions of the ith data transmission and the ith binary digit are equal; and
         if the ith data transmission is unsuccessful, then setting the ith binary digit to 0;
      N is 3;
      a number of positions of the communication channel is 3;
      a number of bits sent during each ACK/NACK transmission is 1;

if the 3 binary digits are (0, 0, 0) or (0, 1, 0), then a first position of the communication channel is selected and the value of the bit is set to 0;
if the 3 binary digits are (0, 0, 1) or (0, 1, 1), then a first position of the communication channel is selected and the value of the bit is set to 1;
if the 3 binary digits are (1, 0, 0), then a second position of the communication channel is selected and the value of the bit is set to 0;
if the 3 binary digits are (1, 0, 1), then a second position of the communication channel is selected and the value of the bit is set to 1;
if the 3 binary digits are (1, 1, 0), then a third position of the communication channel is selected and the value of the bit is set to 0; and
if the 3 binary digits are (1, 1, 1), then a third position of the communication channel is selected and the value of the bit is set to 1.

4. A method comprising: by a first computing device,
combining N ACK/NACK responses respectively corresponding to N data transmissions received from a second computing device;
encoding the combined N ACK/NACK responses, comprising:
selecting one of one or more positions of a communication channel between the first computing device and the second computing device based on the combined N ACK/NACK responses, wherein the first computing device sends ACK/NACK transmissions to the second computing device over the communication channel, and each position of the communication channel corresponds to a frequency or time resource of the communication channel; and
setting a value of each of one or more bits the first computing device sends to the second computing device during each ACK/NACK transmission based on the combined N ACK/NACK responses; and
sending the one or more bits at the selected one of one or more positions over the communication channel to the second computing device;
wherein:
combining N ACK/NACK responses respectively corresponding to N data transmissions received from the second computing device comprises:
representing the N ACK/NACK responses with N binary digits;
if an ith data transmission of the N data transmissions is successful, then setting an ith binary digit of the N binary digits to 1, wherein positions of the ith data transmission and the ith binary digit are equal; and
if the ith data transmission is unsuccessful, then setting the ith binary digit to 0;
N is 4;
a number of positions of the communication channel is 4;
a number of bits sent during each ACK/NACK transmission is 1;
if the 4 binary digits are (0, 0, 0, 0) or (0, 0, 0, 1), then a first position of the communication channel is selected and the value of the bit is set to 0;
if the 4 binary digits are (0, 0, 1, 0) or (0, 0, 1, 1), then a first position of the communication channel is selected and the value of the bit is set to 1;
if the 4 binary digits are (0, 1, 0, 0) or (0, 1, 0, 1), then a second position of the communication channel is selected and the value of the bit is set to 0;
if the 4 binary digits are (0, 1, 1, 0) or (0, 1, 1, 1), then a second position of the communication channel is selected and the value of the bit is set to 1;
if the 4 binary digits are (1, 0, 0, 0) or (1, 0, 0, 1), then a third position of the communication channel is selected and the value of the bit is set to 0;
if the 4 binary digits are (1, 0, 1, 0) or (1, 0, 1, 1), then a third position of the communication channel is selected and the value of the bit is set to 1;
if the 4 binary digits are (1, 1, 0, 0) or (1, 1, 0, 1), then a fourth position of the communication channel is selected and the value of the bit is set to 0; and
if the 4 binary digits are (1, 1, 1, 0) or (1, 1, 1, 1), then a fourth position of the communication channel is selected and the value of the bit is set to 1.

5. The method of claim 1, wherein:
N is greater than 1;
the second computing device is a base station; and
the first computing device is a mobile device connected to the base station.

6. The method of claim 1, further comprising selecting an encoding scheme based on N, a number of positions of the communication channel, and a number of bits the first computing device sends to the second computing device during each ACK/NACK transmission over the communication channel.

7. A first system comprising:
a memory comprising instructions executable by one or more processors; and
the one or more processors coupled to the memory and operable to execute the instructions, the one or more processors being operable when executing the instructions to:
combine N ACK/NACK responses respectively corresponding to N data transmissions received from a second system;
encode the combined N ACK/NACK responses, comprising:
select one of one or more positions of a communication channel between the first system and the second system based on the combined N ACK/NACK responses, wherein the first system sends ACK/NACK transmissions to the second system over the communication channel, and each position of the communication channel corresponds to a frequency or time resource of the communication channel; and
set a value of each of one or more bits the first system sends to the second system during each ACK/NACK transmission based on the combined N ACK/NACK responses; and
send the one or more bits at the selected one of one or more positions over the communication channel to the second-system;
wherein:
combining the N ACK/NACK responses comprises:
represent the N ACK/NACK responses with N binary digits;
if an ith data transmission of the N data transmissions is successful, then setting an ith binary digit of the N binary digits to 1, wherein positions of the ith data transmission and the ith binary digit are equal; and
if the ith data transmission is unsuccessful, then set the ith binary digit to 0;
N is 2;
a number of positions of the communication channel is 2;

a number of bits sent during each ACK/NACK transmission is 1;
if the 2 binary digits are (0, 0), then a first position of the communication channel is selected and the value of the bit is set to 0;
if the 2 binary digits are (0, 1), then a first position of the communication channel is selected and the value of the bit is set to 1;
if the 2 binary digits are (1, 0), then a second position of the communication channel is selected and the value of the bit is set to 0; and
if the 2 binary digits are (1, 1), then a second position of the communication channel is selected and the value of the bit is set to 1.

8. The first system of claim 7, wherein encoding the combined N ACK/NACK responses comprises:
select the one position based on one or more first binary digits of the N binary digits; and
set the value of each of the bits based on one or more second binary digits of the N binary digits.

9. A first system comprising:
a memory comprising instructions executable by one or more processors; and
the one or more processors coupled to the memory and operable to execute the instructions, the one or more processors being operable when executing the instructions to:
combine N ACK/NACK responses respectively corresponding to N data transmissions received from a second system;
encode the combined N ACK/NACK responses, comprising:
select one of one or more positions of a communication channel between the first-system and the second system based on the combined N ACK/NACK responses, wherein the first-system sends ACK/NACK transmissions to the second system over the communication channel, and each position of the communication channel corresponds to a frequency or time resource of the communication channel; and
set a value of each of one or more bits the first system sends to the second system during each ACK/NACK transmission based on the combined N ACK/NACK responses; and
send the one or more bits at the selected one of one or more positions over the communication channel to the second-system;
wherein:
combining the N ACK/NACK responses comprises:
represent the N ACK/NACK responses with N binary digits;
if an ith data transmission of the N data transmissions is successful, then setting an ith binary digit of the N binary digits to 1, wherein positions of the ith data transmission and the ith binary digit are equal; and
if the ith data transmission is unsuccessful, then set the ith binary digit to 0;
N is 3;
a number of positions of the communication channel is 3;
a number of bits sent during each ACK/NACK transmission is 1;
if the 3 binary digits are (0, 0, 0) or (0, 1, 0), then a first position of the communication channel is selected and the value of the bit is set to 0;
if the 3 binary digits are (0, 0, 1) or (0, 1, 1), then a first position of the communication channel is selected and the value of the bit is set to 1;
if the 3 binary digits are (1, 0, 0), then a second position of the communication channel is selected and the value of the bit is set to 0;
if the 3 binary digits are (1, 0, 1), then a second position of the communication channel is selected and the value of the bit is set to 1;
if the 3 binary digits are (1, 1, 0), then a third position of the communication channel is selected and the value of the bit is set to 0; and
if the 3 binary digits are (1, 1, 1), then a third position of the communication channel is selected and the value of the bit is set to 1.

10. A first system comprising:
a memory comprising instructions executable by one or more processors; and
the one or more processors coupled to the memory and operable to execute the instructions, the one or more processors being operable when executing the instructions to:
combine N ACK/NACK responses respectively corresponding to N data transmissions received from a second system;
encode the combined N ACK/NACK responses, comprising:
select one of one or more positions of a communication channel between the first-system and the second system based on the combined N ACK/NACK responses, wherein the first-system sends ACK/NACK transmissions to the second system over the communication channel, and each position of the communication channel corresponds to a frequency or time resource of the communication channel; and
set a value of each of one or more bits the first system sends to the second system during each ACK/NACK transmission based on the combined N ACK/NACK responses; and
send the one or more bits at the selected one of one or more positions over the communication channel to the second-system;
wherein:
combining the N ACK/NACK responses comprises:
represent the N ACK/NACK responses with N binary digits;
if an ith data transmission of the N data transmissions is successful, then setting an ith binary digit of the N binary digits to 1, wherein positions of the ith data transmission and the ith binary digit are equal; and
if the ith data transmission is unsuccessful, then set the ith binary digit to 0;
N is 4;
a number of positions of the communication channel is 4;
a number of bits sent during each ACK/NACK transmission is 1;
if the 4 binary digits are (0, 0, 0, 0) or (0, 0, 0, 1), then a first position of the communication channel is selected and the value of the bit is set to 0;
if the 4 binary digits are (0, 0, 1, 0) or (0, 0, 1, 1), then a first position of the communication channel is selected and the value of the bit is set to 1;
if the 4 binary digits are (0, 1, 0, 0) or (0, 1, 0, 1), then a second position of the communication channel is selected and the value of the bit is set to 0;

if the 4 binary digits are (0, 1, 1, 0) or (0, 1, 1, 1), then a second position of the communication channel is selected and the value of the bit is set to 1;

if the 4 binary digits are (1, 0, 0, 0) or (1, 0, 0, 1), then a third position of the communication channel is selected and the value of the bit is set to 0;

if the 4 binary digits are (1, 0, 1, 0) or (1, 0, 1, 1), then a third position of the communication channel is selected and the value of the bit is set to 1;

if the 4 binary digits are (1, 1, 0, 0) or (1, 1, 0, 1), then a fourth position of the communication channel is selected and the value of the bit is set to 0; and if the 4 binary digits are (1, 1, 1, 0) or (1, 1, 1, 1), then a fourth position of the communication channel is selected and the value of the bit is set to 1.

11. The first system of claim 7, wherein:

N is greater than 1;

the second system is a base station; and the first system is a mobile device connected to the base station.

12. The first system of claim 7, wherein the processors are further operable when executing the instructions to select an encoding scheme based on N, a number of positions of the communication channel, and a number of bits the first system sends to the second system during each ACK/NACK transmission over the communication channel.

13. One or more computer-readable non-transitory storage media embodying software operable when executed by a first electronic system to:

combine N ACK/NACK responses respectively corresponding to N data transmissions received from a second electronic system;

encode the combined N ACK/NACK responses, comprising:

select one of one or more positions of a communication channel between the first electronic system and the second electronic system based on the combined N ACK/NACK responses, wherein the first electronic system sends ACK/NACK transmissions to the second electronic system over the communication channel, and each position of the communication channel corresponds to a frequency or time resource of the communication channel; and set a value of each of one or more bits the first electronic system sends to the second electronic system during each ACK/NACK transmission based on the combined N ACK/NACK responses; and send the one or more bits at the selected one of one or more positions over the communication channel to the second electronic system;

wherein:

combining the N ACK/NACK responses comprises:

represent the N ACK/NACK responses with N binary digits;

if an ith data transmission of the N data transmissions is successful, then setting an ith binary digit of the N binary digits to 1, wherein positions of the ith data transmission and the ith binary digit are equal; and if the ith data transmission is unsuccessful, then set the ith binary digit to 0;

N is 2;

a number of positions of the communication channel is 2;

a number of bits sent during each ACK/NACK transmission is 1;

if the 2 binary digits are (0, 0), then a first position of the communication channel is selected and the value of the bit is set to 0;

if the 2 binary digits are (0, 1), then a first position of the communication channel is selected and the value of the bit is set to 1;

if the 2 binary digits are (1, 0), then a second position of the communication channel is selected and the value of the bit is set to 0; and if the 2 binary digits are (1, 1), then a second position of the communication channel is selected and the value of the bit is set to 1.

14. The media of claim 13, wherein encoding the combined N ACK/NACK responses comprises:

select the one position based on one or more first binary digits of the N binary digits; and set the value of each of the bits based on one or more second binary digits of the N binary digits.

15. One or more computer-readable non-transitory storage media embodying software operable when executed by a first electronic system to:

combine N ACK/NACK responses respectively corresponding to N data transmissions received from a second electronic system;

encode the combined N ACK/NACK responses, comprising:

select one of one or more positions of a communication channel between the first electronic system and the second electronic system based on the combined N ACK/NACK responses, wherein the first electronic system sends ACK/NACK transmissions to the second electronic system over the communication channel, and each position of the communication channel corresponds to a frequency or time resource of the communication channel; and set a value of each of one or more bits the first electronic system sends to the second electronic system during each ACK/NACK transmission based on the combined N ACK/NACK responses; and send the one or more bits at the selected one of one or more positions over the communication channel to the second electronic system;

wherein:

combining the N ACK/NACK responses comprises:

represent the N ACK/NACK responses with N binary digits;

if an ith data transmission of the N data transmissions is successful, then setting an ith binary digit of the N binary digits to 1, wherein positions of the ith data transmission and the ith binary digit are equal; and if the ith data transmission is unsuccessful, then set the ith binary digit to 0;

N is 3;

a number of positions of the communication channel is 3;

a number of bits sent during each ACK/NACK transmission is 1;

if the 3 binary digits are (0, 0, 0) or (0, 1, 0), then a first position of the communication channel is selected and the value of the bit is set to 0;

if the 3 binary digits are (0, 0, 1) or (0, 1, 1), then a first position of the communication channel is selected and the value of the bit is set to 1;

if the 3 binary digits are (1, 0, 0), then a second position of the communication channel is selected and the value of the bit is set to 0;

if the 3 binary digits are (1, 0, 1), then a second position of the communication channel is selected and the value of the bit is set to 1;

if the 3 binary digits are (1, 1, 0), then a third position of the communication channel is selected and the value of the bit is set to 0; and if the 3 binary digits are (1, 1, 1), then a third position of the communication channel is selected and the value of the bit is set to 1.

16. One or more computer-readable non-transitory storage media embodying software operable when executed by a first electronic system to:

combine N ACK/NACK responses respectively corresponding to N data transmissions received from a second electronic system;

encode the combined N ACK/NACK responses, comprising:

select one of one or more positions of a communication channel between the first electronic system and the second electronic system based on the combined N ACK/NACK responses, wherein the first electronic system sends ACK/NACK transmissions to the second electronic system over the communication channel, and each position of the communication channel corresponds to a frequency or time resource of the communication channel; and set a value of each of one or more bits the first electronic system sends to the second electronic system during each ACK/NACK transmission based on the combined N ACK/NACK responses; and send the one or more bits at the selected one of one or more positions over the communication channel to the second electronic system;

wherein:

combining the N ACK/NACK responses comprises:

represent the N ACK/NACK responses with N binary digits;

if an ith data transmission of the N data transmissions is successful, then setting an ith binary digit of the N binary digits to 1, wherein positions of the ith data transmission and the ith binary digit are equal; and if the ith data transmission is unsuccessful, then set the ith binary digit to 0;

N is 4;

a number of positions of the communication channel is 4;

a number of bits sent during each ACK/NACK transmission is 1;

if the 4 binary digits are (0, 0, 0, 0) or (0, 0, 0, 1), then a first position of the communication channel is selected and the value of the bit is set to 0;

if the 4 binary digits are (0, 0, 1, 0) or (0, 0, 1, 1), then a first position of the communication channel is selected and the value of the bit is set to 1;

if the 4 binary digits are (0, 1, 0, 0) or (0, 1, 0, 1), then a second position of the communication channel is selected and the value of the bit is set to 0;

if the 4 binary digits are (0, 1, 1, 0) or (0, 1, 1, 1), then a second position of the communication channel is selected and the value of the bit is set to 1;

if the 4 binary digits are (1, 0, 0, 0) or (1, 0, 0, 1), then a third position of the communication channel is selected and the value of the bit is set to 0;

if the 4 binary digits are (1, 0, 1, 0) or (1, 0, 1, 1), then a third position of the communication channel is selected and the value of the bit is set to 1;

if the 4 binary digits are (1, 1, 0, 0) or (1, 1, 0, 1), then a fourth position of the communication channel is selected and the value of the bit is set to 0; and if the 4 binary digits are (1, 1, 1, 0) or (1, 1, 1, 1), then a fourth position of the communication channel is selected and the value of the bit is set to 1.

17. The media of claim 13, wherein:

N is greater than 1;

the second electronic system is a base station; and the first electronic system is a mobile device connected to the base station.

18. The media of claim 13, wherein the software is further operable when executed by the first electronic system to select an encoding scheme based on N, a number of positions of the communication channel, and a number of bits the first electronic system sends to the second electronic system during each ACK/NACK transmission over the communication channel.

* * * * *